US006850748B2

(12) United States Patent
Song et al.

(10) Patent No.: US 6,850,748 B2
(45) Date of Patent: Feb. 1, 2005

(54) RF FRONT END WITH REDUCED CARRIER LEAKAGE

(75) Inventors: Eunseok Song, Seoul (KR); Seung-Wook Lee, Seoul (KR); Jeong-Woo Lee, Seoul (KR); Joonbae Park, Seoul (KR); Kyeongho Lee, Seoul (KR)

(73) Assignee: GCT Semiconductor, Inc., San Jose, CA (US)

( * ) Notice: Subject to any disclaimer, the term of this patent is extended or adjusted under 35 U.S.C. 154(b) by 27 days.

(21) Appl. No.: 10/207,986

(22) Filed: Jul. 31, 2002

(65) Prior Publication Data

US 2004/0023624 A1 Feb. 5, 2004

(51) Int. Cl.$^{7}$ .................................................. H04B 1/00

(52) U.S. Cl. ....................... 455/302; 455/313; 455/323; 327/117

(58) Field of Search ............................ 455/63.1, 67.11, 455/67.13, 118, 296, 302, 313, 314, 316, 318, 323, 324; 331/18, 25; 327/113, 117, 119; 375/327, 346, 350

(56) References Cited

U.S. PATENT DOCUMENTS 5,640,698 A * 6/1997 Shen et al. ................. 455/323
5,761,615 A 6/1998 Jaffee ......................... 455/314
5,825,254 A * 10/1998 Lee ............................. 331/25
5,937,335 A * 8/1999 Park et al. ..................... 455/76
6,233,444 B1 * 5/2001 Nakanishi ................... 455/313
6,516,187 B1 * 2/2003 Williams et al. ............ 455/313

* cited by examiner

*Primary Examiner*—Quochien B. Vuong
(74) *Attorney, Agent, or Firm*—Fleshner & Kim, LLP

(57) ABSTRACT

A method and apparatus that provide a frequency conversion in a radio frequency front-end are disclosed, including a frequency divider that divides an input signal frequency by a predetermined value to produce an output signal frequency; and a frequency mixer that mixes the output signal frequency with a carrier signal frequency to produce a converted signal frequency, which is substantially equal to a difference between the output signal frequency and the carrier signal frequency. The predetermined value and the input signal frequency are selected such that the carrier signal frequency is not substantially equivalent to an integer multiple of the output signal frequency. The method and apparatus can be used in a wireless communication receiver including wireless communication systems and wireless LAN systems.

33 Claims, 6 Drawing Sheets

RF FRONT END WITH REDUCED CARRIER LEAKAGE

BACKGROUND OF THE INVENTION

1. Field of the Invention

The present invention relates to a front-end of a wireless communication receiver and, more particularly, to a wide-band intermediate frequency (IF) radio receiver and a direct conversion radio receiver.

2. Background of the Related Art

The radio frequency (RF) front-end design in a wireless transceiver is perhaps the most important part of the receiver's design, because its performance in terms of the noise figure and linearity determines the overall performance of the receiver. There exist a number of architectures for implementing the radio transceiver. Two common ones are the heterodyne architecture and the homodyne or direct conversion architecture.

As the demand for multi-mode and multi-band radio receivers grows, so too does the attention given to the direct conversion radio receiver. Although it has a simply illustrated configuration, practical use of the direct conversion receiver in the wireless market has been delayed due to its inherent problems. These problems relate to a direct current (D/C) component offset noise, which is proportional to the inverse value of the frequency (1/f), and even-order distortion. Of these, the DC offset problem is more difficult to solve, because there is a conflicting condition between DC offset measurement and DC offset correction. The main cause of the DC offset results from carrier leakage.

FIG. 1 illustrates a block diagram of the related art direct conversion receiver that suffers carrier leakage. Spectral leakage 5 or coupling of the local oscillator (LO) 1 signal is added to the input signal of the low-noise amplifier (LNA) 2. This added signal has the same frequency component as the LO 1 signal, and thus, produces the DC component at the mixer 3 output. This DC component, in turn, is added to the incoming signal. In a typical wireless application of the related art, the required dynamic range exceeds 80 decibels (dB), and thus, the output of the receiver can be saturated even with the small offset.

Since the DC offset is located very close to DC, the measurement process of the DC offset requires too much time to perform for an offset cancellation technique based on averaging. Also, the correction time for cancelling the DC offset tends to be long. In wireless systems requiring a fast DC offset cancellation, most approaches are not feasible because of the above-described reasons. Therefore, reducing the DC offset to a negligible level, rather than completely eliminating it, may be highly desired. To reduce the DC offset, it is quite important to reduce the amount of carrier leakage to the antenna 4 and to the input of the LNA 2.

FIG. 2 illustrates a related art wide-band zero IF, RF front-end design, used in recent years, that reduces the carrier leakage. A complete description of FIG. 2 may be found in U.S. Pat. No. 5,761,615, which is hereby incorporated by reference. The illustrated configuration is similar to a related art heterodyne receiver. However, the main difference between the related art heterodyne receiver and the illustrated design is the selection of the intermediate frequency (IF).

FIG. 3 illustrates a related art super-heterodyne receiver. For the super-heterodyne receiver, the IF frequency is chosen to be about one-fifth the carrier frequency, to solve the trade-off between image and channel selectivity. Before the down conversion 31, an image rejection filter 32 is inserted to block the signal of the image band. After first down conversion 31, the narrow band-pass filter 33 rejects the unwanted signal.

The principal difference between the designs of FIGS. 2 and 3 is the absence of the band-pass filter, used for channel selection, and of the image rejection filter in the design illustrated by FIG. 2. This is feasible in the circuit of FIG. 2, because the IF frequency is so high that the front-end filter, intended to provide band selection, is also sufficient to reject the image signal. Channel selection is done at baseband, instead of at IF band. When using high performance baseband circuits, the performance degradation of wide-band IF conversion, such as that performed by the circuit illustrated in FIG. 2, becomes negligible.

In the wide-band zero IF receiver, the sum of the two local oscillator frequencies 21 and 22 is equal to the original carrier frequency 23. Whenever signal amplification is done at baseband, careful design of the RF front-end is required to produce a low DC offset. This is because alternating current (AC) coupling or its equivalent is not as pronounced, due to its long settling time constant. The most critical source for the DC offset is the carrier leakage.

Referring now to FIG. 1, the carrier leakage is inevitable when there are sub-harmonically related signals to the carrier frequency. For example, as shown in FIG. 2, the fifth harmonic frequency of the second LO signal 22, generated by the divide-by-four circuit 23, is the same frequency as the desired carrier frequency. Thus, the leakage of the second LO signal 22 to the antenna port (not shown) will produce the DC offset at the mixer 24 output. This simple observation shows that all harmonics or sub-harmonics of LO signals should be different from the carrier signal, to avoid producing the DC offset.

Since the signal isolation is not perfect in any RF front-end implementation, spectral leakage occurs through electromagnetic radiation, substrate-coupling, and parasitic coupling. In the related art implementations, this spectral coupling is compounded by harmonic components of LO signals having the same frequency as the carrier frequency, thereby producing the DC offset component at the down-conversion mixer output. This occurs in the related art implementations because the designs use a divide-by-N circuit to generate each of the mixing frequencies, from a voltage controlled oscillator (VCO) producing a signal at the RF carrier frequency. Since N is an integer in these designs, a harmonic having the same frequency as the RF carrier being mixed will necessarily be produced by the down-converter.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Therefore, an object of the present invention is to provide a radio frequency (RF) front-end that reduces carrier leakage.

Another object of the present invention is to provide an RF front-end that reduces DC offset at the mixer output.

Still another object of the present invention is to provide an RF front-end for use in a highly integrated radio receiver.

A further object of the present invention is to provide a fractional divider, or its equivalent, for the generation of LO signals in the RF front-end.

A further object of the present invention is to employ a fractional divider in the RF front-end to eliminate the generation of frequency components, by the down-converter, that are harmonically related to the RF carrier.

The objects of the present invention may be achieved in whole or in part by a frequency converter, including a frequency divider that divides an input signal frequency by a prescribed value to produce an output signal frequency; and a frequency mixer that mixes the output signal frequency with a carrier signal frequency to produce a converted signal frequency, which is substantially equal to a difference between the output signal frequency and the carrier signal frequency. The prescribed value and the input signal frequency are selected such that the carrier signal frequency is not substantially equivalent to an integer multiple of the output signal frequency.

The objects of the present invention may be further achieved in whole or in part by a frequency converter, including N frequency dividers that each divides an Nth input signal frequency by an Nth value to produce an Nth output signal frequency; and N frequency mixers that each mix a separate corresponding one of the N output signal frequencies with a separate one of N corresponding carrier signal frequencies to produce an Nth converted signal frequency, which is substantially equal to a difference between the Nth output signal frequency and the Nth carrier signal frequency. N is an integer greater than one and the Nth value and the corresponding Nth input signal frequency are selected such that the Nth carrier signal frequency is not substantially equivalent to an integer multiple of the Nth output signal frequency.

The objects of the present invention may be further achieved in whole or in part by a method of frequency conversion, including dividing an input signal frequency by a predetermined value to produce an output signal frequency; and mixing the output signal frequency with a carrier signal frequency to produce a converted signal frequency, which is substantially equal to a difference between the output signal frequency and the carrier signal frequency. The predetermined value and the input signal frequency are selected such that the carrier signal frequency is not substantially equivalent to an integer multiple of the output signal frequency.

The objects of the present invention may be further achieved in whole or in part by a method of frequency conversion, including dividing each of N input signal frequencies by a corresponding Nth value to produce a corresponding Nth output signal frequency; and mixing each of the N output signal frequencies with a separate one of N corresponding carrier signal frequencies to produce an Nth converted signal frequency, which is substantially equal to a difference between the Nth output signal frequency and the Nth carrier signal frequency. N is an integer greater than one and the Nth value and the corresponding Nth input signal frequency are selected such that the Nth carrier signal frequency is not substantially equivalent to an integer multiple of the Nth output signal frequency.

The objects of the present invention may be further achieved in whole or in part by a communication system including a frequency converter, wherein the frequency converter includes N frequency dividers that each divides an Nth input signal frequency by an Nth value to produce an Nth output signal frequency, and N frequency mixers that each mix a separate corresponding one of the N output signal frequencies with a separate one of N corresponding carrier signal frequencies to produce an Nth converted signal frequency, which is substantially equal to a difference between the Nth output signal frequency and the Nth carrier signal frequency, wherein N is an integer greater than one, and the Nth value and the corresponding Nth input signal frequency are selected such that the Nth carrier signal frequency is not substantially equivalent to an integer multiple of the Nth output signal frequency, an antenna that receives signals including selected signals having a frequency equal to a highest valued input signal frequency, a RF filter coupled to the antenna that filters the received selected signals, a low noise amplifier coupled to the RF filter that amplifies the filtered selected signals with a gain, an image reject filter that filters signals received from the low noise amplifier, wherein the N frequency mixers convert the selected signals having the highest valued input signal frequency to baseband signals, an A/D converting unit that converts the base-band signals into digital signals, and a discrete-time signal processing unit that receives the digital signals.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Reference will now be made in detail to the preferred embodiments of the present invention, examples of which are illustrated in the accompanying drawings.

Figure 4:
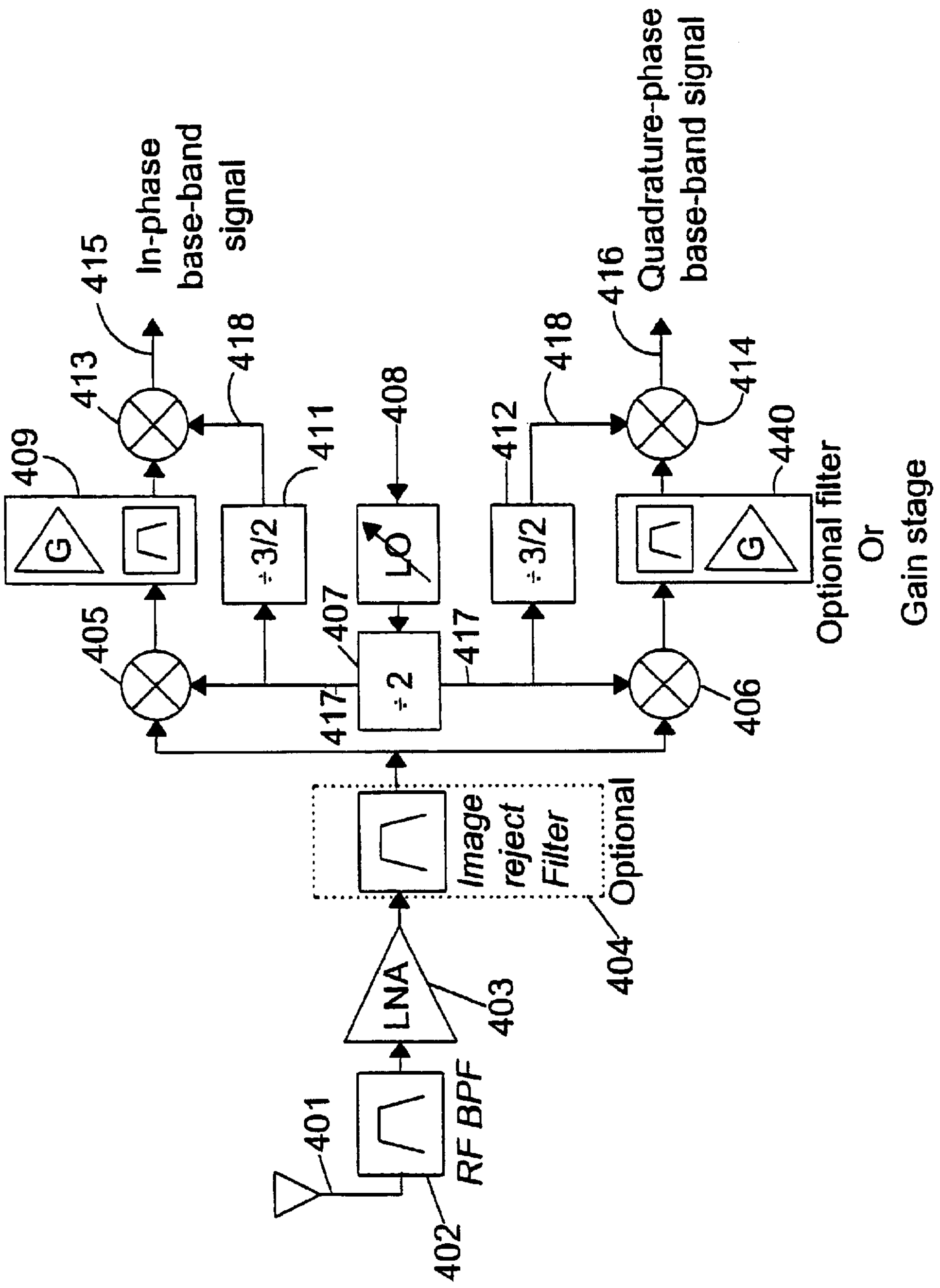
FIG. 4 illustrates a preferred embodiment of an RF front-end of the present invention having reduced DC offset.

FIG. 4 illustrates a first preferred embodiment of an RF front-end for reducing or eliminating the DC offset. An antenna 401 provides a received radio frequency (RF) signal to RF bandpass filter (BPF) 402. RF BPF 402 filters the received RF signal to reduce or minimize the spectral energy of frequency components, outside the intended pass band, passed to a low noise amplifier (LNA) 403. LNA 403 amplifies the pass band signal, centered about the carrier frequency, that it receives from RF BPF 402 and passes the amplified signal to an optional image reject filter 404. Image reject filter 404 minimizes the spectral energy of the image signal received from LNA 403 and passes the filtered signal to both the in-phase first mixer 405 and the quadrature-phase first mixer 406. A variable frequency local oscillator (LO) 408 supplies a first divider 407 with a multiple of the first mixing frequency 417. First divider 407 divides the frequency of the signal, received from LO 408, preferably by two and supplies the resultant signal to first mixers 405, 406 and to two second dividers 411, 412, as the first mixing frequency 417. First mixers 405, 406 mix the signal received from the optional image reject filter 404, or from LNA 403 if the image reject filter is not included in the circuit, with first mixing frequency 417 to produce the in-phase IF signal and the quadrature-phase IF signal, respectively. The in-phase IF signal is provided to second mixer 413 either directly or after being amplified or filtered by an optional gain or filter stage 409. Similarly, the quadrature-phase IF signal is provided to second mixer 414 either directly or after being amplified or filtered by an optional gain or filter stage 410. Second dividers 411, 412 divide the first mixing frequency by 3/2 and provide the quotient to second mixers 413, 414, respectively, as the second mixing frequency 418. Second mixer 413 mixes the second mixing frequency 418 with the in-phase IF signal received directly or indirectly from first mixer 405. The signal product produced by second mixer 413 is the in-phase baseband signal 415. Similarly, second mixer 414 mixes the second mixing frequency 418 with the in-phase IF signal received directly or indirectly from first mixer 406. The signal product produced by second mixer 414 is the quadrature-phase baseband signal 416.

Figure 1:
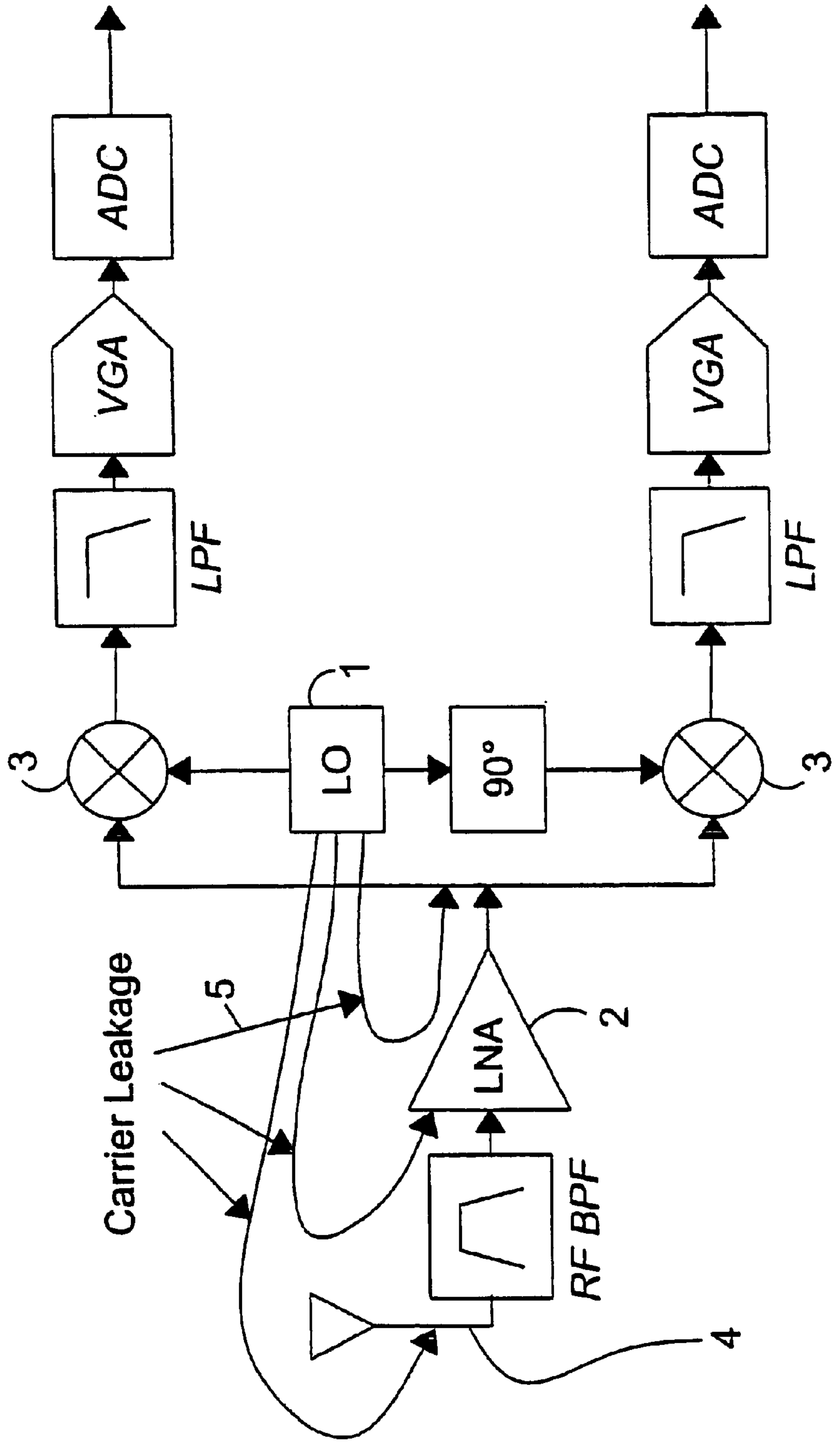
FIG. 1 illustrates a block diagram of a related art direct conversion radio receiver having carrier leakage.
Figure 2:
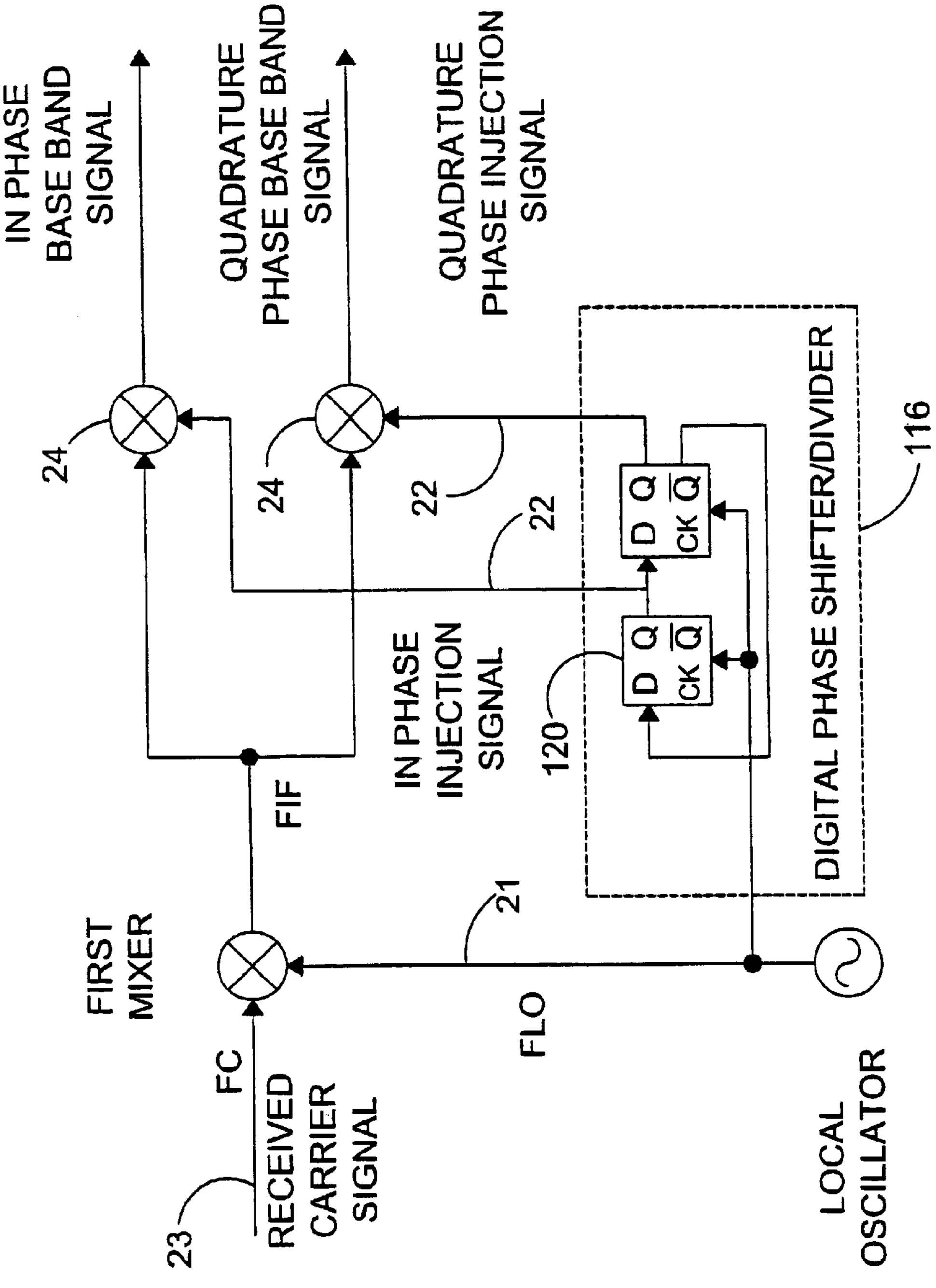
FIG. 2 illustrates a wide-band zero IF, RF front-end of the related art.
Figure 3:
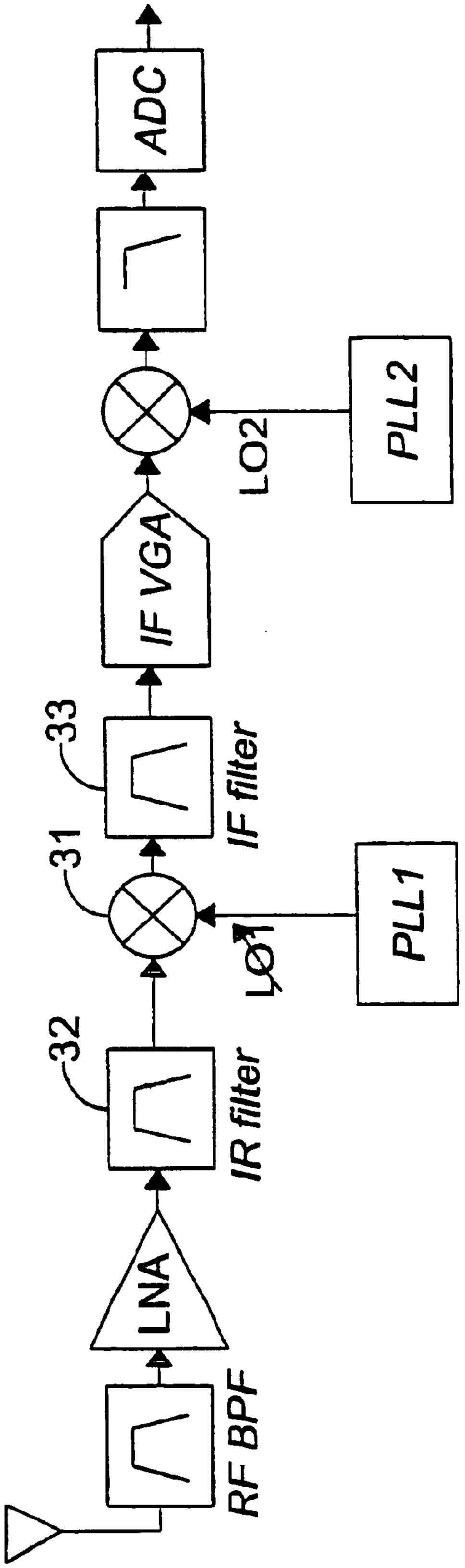
FIG. 3 illustrates a super-heterodyne receiver of the related art.

The circuit configuration of FIG. 4 is similar to the wideband intermediate frequency (IF) topology illustrated in FIG. 2, but the LO frequency allocation is different. All of the harmonics and sub-harmonics produced by the circuit of FIG. 4 are different from the desired carrier frequency. Thus, there is no down-converted mixing term producing the DC offset at the mixer output. The desired carrier frequency may be synthesized according to the following general equation:

$$f_c = \sum_i \left(\frac{N_i}{M_i}\right) \tag{1}$$

In equation 1, $f_c$ is the desired carrier frequency and each of the $i^{th}$ $N_i/M_i$ is a mixing frequency provided to the $i^{th}$ down-converting mixer.

Any combination of the terms $N_i/M_i$ meeting the following requirement becomes a solution for identifying the mixing frequencies and, thereby, identifying the divisor values of first divider 407 and second dividers 411, 412. The constraint is that no potential integer multiple of the selected $N_i/M_i$ (i.e., $k \cdot N_i/M_i$, where k is any integer value) may produce a product equal to the desired carrier frequency, $f_c$. In other words, the harmonics of all LO signals should be different from the carrier frequency.

A principal difference between preferred embodiments according to the present invention and the related art circuit of FIG. 2 is that according to the present invention, no harmonics or sub-harmonics of $N_i/M_i$ are equal to $f_c$. The related art circuit illustrated in FIG. 2 fails to meet the above condition, because the fifth harmonic of the second LO signal is the same as the carrier frequency. Thus, with the preferred embodiments according to the present invention, any spectral leakage to the antenna port does not contribute to the DC offset, because the mixing products have a high frequency.

An examination of equation 1 reveals that numerous solutions for combinations of mixing frequencies used by the RF front-end can be devised, while meeting the specified requirement. FIG. 4 illustrates just one of the many possible implementations that preserves such a feature of the present invention. In FIG. 4, the carrier frequency is generated by the following equation:

$$f_c = \sum\left[\frac{1}{2}f_{LO} + \frac{1}{2}\cdot\frac{2}{3}f_{LO}\right] = \sum\left[\frac{1}{2}\left(\frac{6}{5}f_c\right) + \frac{1}{2}\cdot\frac{2}{3}\left(\frac{6}{5}f_c\right)\right] \tag{2}$$

In equation 2, the LO frequency, $f_{LO}$, is selected as the product of the desired carrier frequency, $f_c$, and the fractional multiplicand 6/5. Therefore, first divider 407 is selected to divide $f_{LO}$ by two and second dividers 411, 412 are selected to divide the first mixing frequency by 3/2. Stated another way to reflect the correspondence between equation 2 and FIG. 4, first divider 407 is selected to multiply $f_{LO}$ by ½ and second dividers 411, 412 are selected to multiply the product of ½ and $f_{LO}$ by ⅔. Notice that no integer multiples of the mixing frequencies, $N_i/M_i$ (i.e., $6/10 \cdot f_c$ and $4/10 \cdot f_c$), produce a product equal to the desired carrier frequency, $f_c$.

Most modern communication receivers require the recovery of both an in-phase and a quadrature-phase base-band signal. Thus, the LO 408 should provide both the in-phase and quadrature-phase mixing frequencies. Two well-known methods for producing both the in-phase and quadrature-phase mixing signals from a single LO make use of either a phase shifter or a divide-by-two circuit. Although the phase accuracy is better with the divide-by-two circuit, the LO should operate at twice the mixing frequency. FIG. 4 illustrates just one of many possible implementations that make use of the divide-by-two circuit for the generation of the quadrature LO signal. Another possible implementation is shown in FIG. 5.

Figure 5:
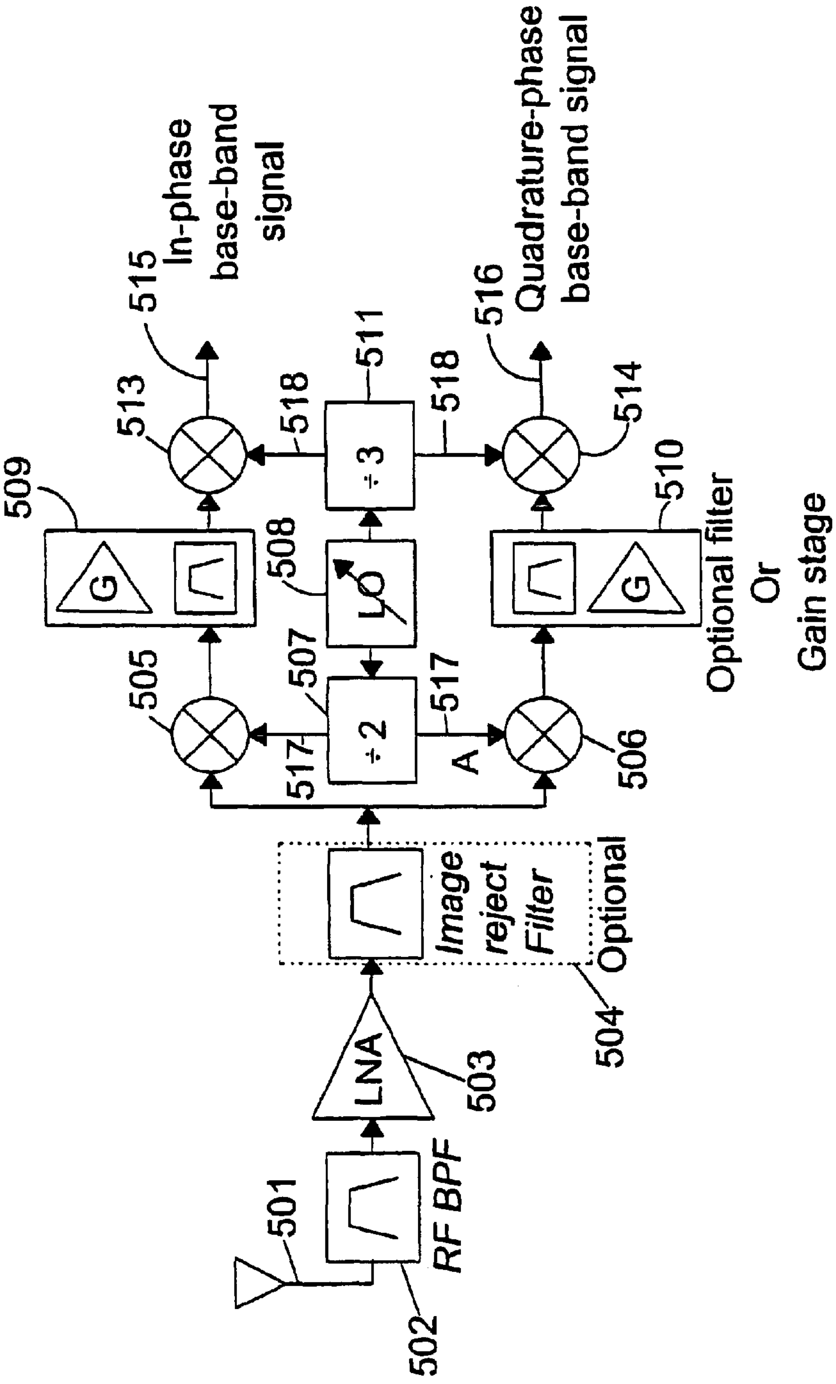
FIG. 5 illustrates another preferred embodiment of an RF front-end of the present invention.

FIG. 5 illustrates a second preferred embodiment of an RF front-end of the present invention. An antenna 501 provides a received radio frequency (RF) signal to RF bandpass filter (BPF) 502. RF BPF 502 filters the received RF signal to minimize or reduce the spectral energy of frequency components, outside the intended pass band, passed to a low noise amplifier (LNA) 503. LNA 503 amplifies the pass band signal, centered about the carrier frequency, that it receives from RF BPF 502 and passes the amplified signal to an optional image reject filter 504. Image reject filter 504 minimizes or reduces the spectral energy of the image signal received from LNA 503 and passes the filtered signal to both the in-phase first mixer 505 and the quadrature-phase first mixer 506. A variable frequency local oscillator (LO) 508 supplies a first divider 507 and a second divider 511 with multiples of the first and second mixing frequencies 517 and 518, respectively. First divider 507 divides the frequency of the signal, received from LO 508, by two and preferably supplies a resultant signal to first mixers 505, 506. First mixers 505, 506 mix the signal received from the optional image reject filter 504, or from LNA 503 if the image reject filter is not included in the circuit, with the first mixing frequency 517 to produce the in-phase IF signal and the quadrature-phase IF signal, respectively.

The in-phase IF signal is provided to second mixer 513 either directly or after being amplified or filtered by an optional gain or filter stage 509. Similarly, the quadrature-phase IF signal is provided to second mixer 514 either directly or after being amplified or filtered by an optional gain or filter stage 510. Second divider 511 divides the first mixing frequency by 3 and provides the quotient to second mixers 513, 514, respectively, as the second mixing frequency. Second mixer 513 mixes the second mixing frequency 518 with the in-phase IF signal received directly or indirectly from first mixer 505. The signal product produced by second mixer 513 is the in-phase baseband signal 515. Similarly, second mixer 514 mixes the second mixing frequency 518 with the in-phase IF signal received directly or indirectly from first mixer 506. The signal product produced by second mixer 514 is the quadrature-phase baseband signal 516.

Using equation 1 above, the carrier frequency generation in FIG. 5 can be expressed by equation 3.

$$f_c = \sum_{i=2}\left(\frac{1}{2}f_{LO} + \frac{1}{3}f_{LO}\right) = \sum_{i=2}\left(\frac{1}{2}\left(\frac{6}{5}f_c\right) + \frac{1}{3}\left(\frac{6}{5}f_c\right)\right) \tag{3}$$

In equation 3, the LO frequency, $f_{LO}$, is selected as the product of the desired carrier frequency, $f_c$, and the fractional multiplicand 6/5. Therefore, first divider 507 can be selected to divide $f_{LO}$ by two and second divider 511 can be selected to divide $f_{LO}$ by 3. Stated another way, first divider 507 is selected to multiply $f_{LO}$ by ½ and second divider 511 is selected to multiply $f_{LO}$ by ⅓. Notice that no integer multiples of the mixing frequencies, $N_i/M_i$ (i.e., $\frac{3}{5}\cdot f_c$ and $\frac{2}{5}\cdot f_c$), produce a product equal to the desired carrier frequency, $f_c$. Since the frequency of the local oscillator is 6/5 of the desired carrier frequency in the second preferred embodiment, the divide-by-two divider followed by the fractional divider in FIG. 4 can be replaced with the divide-by-three circuit, as shown in FIG. 5.

Referring to the general formula for the LO signal generation in equation 1, the number of down-conversion stages is equal to the number of terms, identified by index i, summed together in equation 1. Since certain structure of preferred embodiments is similar to the wide-band zero IF, RF front-end illustrated in FIG. 2, suitable filtering stages for image rejection are preferred in the signal path. Unlike the super-heterodyne receiver, the frequency difference between the desired band and the image band is large, and thus, simple low pass or bandpass filters can be preferably used for this purpose, with the present invention. In addition, the deterioration of the noise figure can be mitigated by inserting the appropriate gain stage between the two neighboring down conversion stages. These design considerations are also illustrated in FIG. 4 and FIG. 5 for better understanding. For example, in the circuit illustrated by FIG. 4, gain stage 409 is inserted in a signal path between first mixer 405 and second mixer 413, and gain stage 410 is inserted in the signal path between first mixer 406 and second mixer 414. Similarly for the circuit illustrated by FIG. 5, gain stage 509 is inserted in the signal path between first mixer 505 and second mixer 513, and gain stage 510 is inserted in the signal path between first mixer 506 and second mixer 514.

Figure 6:
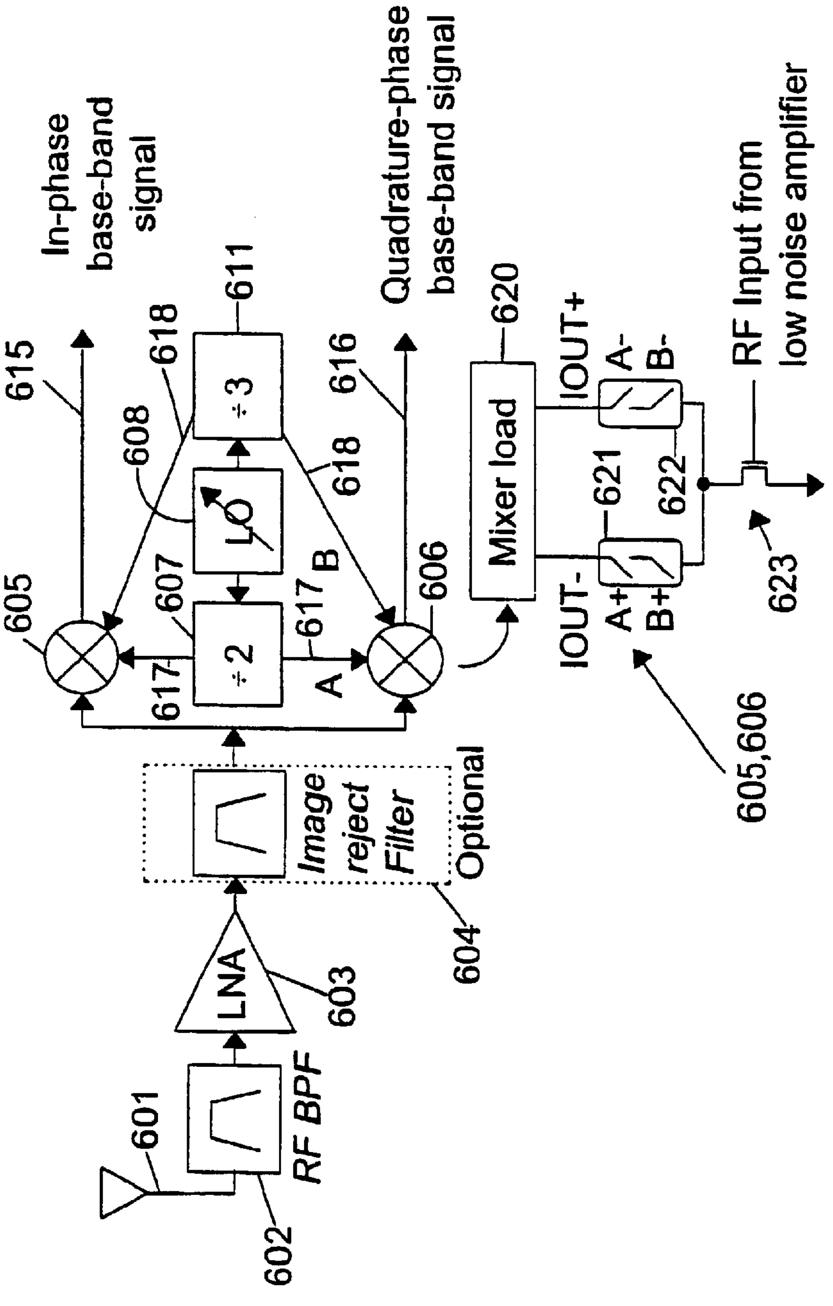
FIG. 6 illustrates a third preferred embodiment of a RF front-end of the present invention having a single down-conversion stage.

Like the frequency conversion performed by the multi-phase mixer described in U.S. Pat. No. 6,313,688, the teachings of which are hereby incorporated by reference, the present invention may make use of a single stage down-converter, employing a multi-phase mixer. FIG. 6 shows a preferred embodiment of the present invention using a single down-conversion stage with stacked switches.

As shown in FIG. 6, an antenna 601 provides a received radio frequency (RF) signal to RF bandpass filter (BPF) 602. RF BPF 602 filters the received RF signal to minimize or reduce the spectral energy of frequency components, outside the intended pass band, passed to a low noise amplifier (LNA) 603. LNA 603 amplifies the pass band signal, centered about the carrier frequency, that it receives from RF BPF 602 and passes the amplified signal to an optional image reject filter 604. Image reject filter 604 minimizes or reduces the spectral energy of the image signal received from LNA 603 and passes the filtered signal to both the in-phase mixer 605 and the quadrature-phase mixer 606. A variable frequency local oscillator (LO) 608 preferably supplies a first divider 607 and a second divider 611 with multiples of the first and second mixing frequencies 617 and 618, respectively. First divider 607 divides the frequency of the signal, received from LO 608, by two and supplies the resultant signal to mixers 605, 606 as the first mixing frequency 617. Similarly, second divider 611 divides the frequency of the signal, received from LO 608, by three and supplies the resultant signal to mixers 605, 606 as the second mixing frequency 618.

Mixers 605, 606 each preferably include a mixer load 620, two stacked switches 621 and 622, and a transistor 623. The stacked switches 621, 622 are preferably connected in parallel with mixer load 620 and with transistor 623. Mixer load 620 is connected in series with transistor 623 through a voltage source. Other mixer configurations may be used with preferred embodiments according to the present invention and are well known to one of ordinary skill in the art, including those taught by the above-mentioned reference.

Preferably stacked switches 621, 622 are formed of two MOSFET transistors connected in series with the drain of one transistor from each stacked switch 621, 622 connected to mixer load 620 and the source of the other transistor from each stacked switch 621, 622 connected to transistor 623. The gate of one transistor, forming the series connected transistors, in each stacked switch 621, 622 receives the first mixing frequency 617 to modulate its switching operation. The gate of the other transistor, forming the series connected transistors, in each stacked switch 621, 622 receives the second mixing frequency 618 to modulate its switching operation. However, stacked switch 621 preferably receives first and second mixing frequencies 617, 618 with a 180-degree phase inversion to the first and second mixing frequencies 617, 618 simultaneously received by stacked switch 622.

Preferably, transistor 623 is also a MOSFET, having its drain connected to both stacked switches 621, 622 and its source connected to one potential of the voltage source. The other potential of the voltage source is series connected to mixer load 620. The gate of transistor 623 receives the RF signal from the optional image reject filter 604, or from LNA 603 if the image reject filter is not included in the circuit. This RF signal modulates the switching operation of transistor 623. Mixers 605, 606 mix both the first and second mixing frequencies 617, 618 with the RF signal to produce the in-phase baseband signal 615 and the quadrature-phase baseband signal 616, respectively.

Using equation 1 above, the carrier frequency generation in FIG. 6 can be expressed by equation 4, which is identical to the previously described equation 3.

$$f_c = \sum_{i=2}\left(\frac{1}{2}f_{LO} + \frac{1}{3}f_{LO}\right) = \sum_{i=2}\left(\frac{1}{2}\left(\frac{6}{5}f_c\right) + \frac{1}{3}\left(\frac{6}{5}f_c\right)\right) \tag{4}$$

In equation 4, the LO frequency, $f_{LO}$, is selected as the product of the desired carrier frequency, $f_c$, and the fractional multiplicand 6/5. Therefore, first divider 607 is selected to divide $f_{LO}$ by two and second divider 611 is selected to divide $f_{LO}$ by 3. Stated another way, first divider 607 is selected to multiply $f_{LO}$ by ½ and second divider 611 is selected to multiply $f_{LO}$ by ⅓. Notice that no integer multiples of the mixing frequencies, $N_i/M_i$ (i.e., $\frac{3}{5}\cdot f_c$ and $\frac{2}{5}\cdot f_c$), produce a product equal to the desired carrier frequency, $f_c$.

As was the case with regard to the circuit illustrated by FIG. 5, the circuit illustrated by FIG. 6 also has no harmonics or spectral leakage directly related to the carrier frequency. Thus, this embodiment has no DC offset either. Since there is only one down-conversion stage in the signal path, the hardware complexity is further reduced from that illustrated in FIG. 5.

Table 1 lists several other combinations of LO signals that may be used according to the present invention to eliminate the DC offset problem. The term $F_{LOi}$ in the table refers to the $i^{th}$ mixing frequency (where i=1, 2, . . . ). The LO frequency combinations of Table 1 may used with multi-stage mixers, such as those illustrated in FIGS. 4 and 5, or with single stage, multi-phase mixers, such as those illustrated in FIG. 6. The circuit implementation may use either the fractional divider or the integer divider, for the generation of multiple LO signals, and the LO phase may be adjusted for the in-phase and quadrature-phase signals. Additionally, a single VCO with several dividers can be used for the generation of all required LO signals.

TABLE 1

| $F_{LO1}$ | $F_{LO2}$ | $F_{LO3}$ | Sum |
|---|---|---|---|
| $(3/5)f_c$ | $(2/5)f_c$ | | $f_c$ |
| $(4/7)f_c$ | $(3/7)f_c$ | | $f_c$ |
| $(5/9)f_c$ | $(4/9)f_c$ | | $f_c$ |
| $(5/9)f_c$ | $(2/9)f_c$ | $(2/9)f_c$ | $f_c$ |

The invention may be applied to the RF front-end in any kind of wireless communication receiver, including cellular systems and wireless-LAN systems. Since the invention deals with the reduction of carrier leakage and DC offset, it is especially suitable for wide-band IF and direct conversion radio receivers.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A frequency converter, comprising:

a frequency divider that divides an input signal frequency by a prescribed value to produce an output signal frequency;

a frequency mixer that mixes the output signal frequency with a carrier signal frequency to produce a converted signal frequency, which is substantially equal to a difference between the output signal frequency and the carrier signal frequency, wherein the prescribed value and the input signal frequency are selected such that the carrier signal frequency is not substantially equivalent to an integer multiple of the output signal frequency;

N frequency dividers that each divide the input signal frequency by prescribed values to produce N output signal frequencies, wherein N is an integer greater than one, and the sum of the N output signal frequencies is substantially equal to the carrier signal frequency; and an oscillator that generates the input signal frequency, wherein the frequency mixer is a single mixer that simultaneously combines the N output signal frequencies with the carrier signal frequency to convert the carrier signal frequency to a baseband signal frequency.

2. The frequency converter of claim 1, wherein the input signal frequency is substantially equivalent to the carrier signal frequency multiplied by a compound fraction.

3. A frequency converter, comprising:

N frequency dividers that each divides an Nth input signal frequency by an Nth value to produce an Nth output signal frequency; and N frequency mixers that each mix a separate corresponding one of the N output signal frequencies with a separate one of N corresponding carrier signal frequencies to produce an Nth converted signal frequency, which is substantially equal to a difference between the Nth output signal frequency and the Nth carrier signal frequency, wherein N is an integer greater than one, and the Nth value and the corresponding Nth input signal frequency are selected such that the Nth carrier signal frequency is not substantially equivalent to an integer multiple of the Nth output signal frequency, wherein each of the plurality of the Nth output signal frequency are generated so all harmonics of said each of the Nth output signal frequency are different from the carrier frequency.

4. The frequency converter of claim 3, wherein the Nth value and the corresponding Nth input signal frequency are selected such that none of the N carrier signal frequencies are substantially equivalent to an integer multiple of any of the N output signal frequencies.

5. The frequency converter of claim 3, wherein the N input signal frequencies have substantially the same frequency.

6. The frequency converter of claim 3, wherein:

an $M^{th}$ output signal frequency serves as an $M^{th+1}$ input signal frequency to a corresponding $M^{th+1}$ frequency divider; and M is an integer value that is equal to N−1.

7. The frequency converter of claim 3, wherein:

each $M^{th}$ output signal frequency serves as an $M^{th+1}$ input signal frequency to a corresponding $M^{th+1}$ frequency divider; and M is an integer value that is greater than one and less than N.

8. The frequency converter of claim 7, wherein the sum of the N output signal frequencies is substantially equal to the highest valued carrier signal frequency.

9. The frequency converter of claim 3, further comprising:

an oscillator that generates the highest valued input signal frequency, wherein the highest valued input signal frequency is substantially equivalent to the highest valued carrier signal frequency multiplied by a compound fraction.

10. The frequency converter of claim 9, wherein the compound fractions is 6/5, 8/7, or 10/9.

11. A method of frequency conversion, comprising:

dividing an input signal frequency by a predetermined value to produce an output signal frequency; and mixing the output signal frequency with a carrier signal frequency to produce a converted signal frequency, which is substantially equal to a difference between the output signal frequency and the carrier signal frequency, wherein the predetermined value and the input signal frequency are selected such that the carrier signal frequency is not substantially equivalent to an integer multiple of the output signal frequency;

dividing the input signal frequency by predetermined values to produce N output signal frequencies, wherein N is an integer greater than one, and the sum of the N output signal frequencies is substantially equal to the carrier signal frequency; and mixing the N output signal frequencies in a single mixer with the carrier signal frequency to convert the carrier signal frequency to a baseband signal frequency.

12. The method of claim 11, further comprising:

generating the input signal frequency with an oscillator, wherein the input signal frequency generated by the oscillator is substantially equivalent to the carrier signal frequency multiplied by a compound fraction.

13. A method of frequency conversion, comprising:

dividing each of N input signal frequencies by a corresponding Nth value to produce a corresponding Nth output signal frequency; and mixing each of the N output signal frequencies with a separate one of N corresponding carrier signal frequencies to produce an Nth converted signal frequency, which is substantially equal to a difference between the Nth output signal frequency and the Nth carrier signal frequency, wherein N is an integer greater than one, and the Nth value and the corresponding Nth input signal frequency are selected such that the Nth carrier signal frequency is not substantially equivalent to an integer multiple of the Nth output signal frequency, and wherein said each of the plurality of N output signal frequencies are generated so all harmonics of said each of the plurality of N output signal frequencies are different from the carrier frequency.

14. The method of claim 13, wherein the Nth value and the corresponding Nth input signal frequency are selected such that none of the N carrier signal frequencies are substantially equivalent to an integer multiple of any of the N output signal frequencies.

15. The method of claim 14, wherein the N input signal frequencies have substantially the same frequency.

16. The method of claim 15, wherein the sum of the N output signal frequencies is substantially equal to the highest valued carrier signal frequency.

17. The method of claim 13, further comprising:

providing an $M^{th}$ output signal frequency to an $M^{th+1}$ frequency divider as an $M^{th+1}$ input signal frequency, wherein the $M^{th+1}$ frequency divider divides the $M^{th+1}$ input signal frequency by the corresponding Nth value to produce the corresponding $M^{th+1}$ output signal frequency, and M is an integer value that is equal to N−1.

18. The method of claim 13, further comprising:

providing each $M^{th}$ output signal frequency to an $M^{th+1}$ frequency divider as an $M^{th+1}$ input signal frequency, wherein each $M^{th+1}$ frequency divider divides the $M^{th+1}$ input signal frequency by the corresponding Nth value to produce the corresponding $M^{th+1}$ output signal frequency, and M is an integer value that is greater than one and less than N.

19. The method of claim 18, wherein the output signals are input to a single mixer.

20. The method of claim 13, further comprising:

generating the highest valued input signal frequency, wherein the highest valued input signal frequency is substantially equivalent to the highest valued carrier signal frequency multiplied by a compound fraction.

21. The method of claim 20, wherein the compound fractions is 6/5, 8/7, or 10/9.

22. A communication system, comprising:

a frequency converter, wherein the frequency converter comprises,

N frequency dividers that each divides an Nth input signal frequency by an Nth value to produce an Nth output signal frequency, and N frequency mixers that each mix a separate corresponding one of the N output signal frequencies with a separate one of N corresponding carrier signal frequencies to produce an Nth converted signal frequency, which is substantially equal to a difference between the Nth output signal frequency and the Nth carder signal frequency, wherein N is an integer greater than one, and the Nth value and the corresponding Nth input signal frequency are selected such that the Nth carrier signal frequency is not substantially equivalent to an integer multiple of the Nth output signal frequency, wherein each of the plurality of the Nth output signal frequency are generated so all harmonics of said each of the Nth output signal frequency are different from the carrier frequency;

an antenna that receives signals including selected signals having a frequency equal to a highest valued input signal frequency;

a RF filter coupled to the antenna that filters the received selected signals;

a low noise amplifier coupled to the RF filter that amplifies the filtered selected signals with a gain;

an image reject filter that filters signals received from the low noise amplifier, wherein the N frequency mixers convert the selected signals having the highest valued input signal frequency to baseband signals;

an A/D converting unit that converts the base-band signals into digital signals; and a discrete-time signal processing unit that receives the digital signals.

23. A method for demodulating signals, comprising:

dividing an input signal to generate first and second oscillator signals;

mixing a received signal at a carrier frequency with the first oscillator signal to generate an intermediate frequency signal; and mixing the intermediate frequency signal with the second oscillator signal, wherein the first and second oscillator signals are generated so that all harmonics of the first and second oscillator signals are different from the carrier frequency.

24. The method of claim 23, wherein said generating step includes:

generating the first oscillator signal by dividing a reference frequency by a first value; and generating the second oscillator signal by dividing the first oscillator signal by a second value, wherein the first value and the second value are selected so that a sum of the first oscillator signal and the second oscillator signal at least substantially equals the carrier frequency.

25. The method of claim 23, wherein said generating step includes:

generating the first oscillator signal by dividing a reference frequency by a first value; and generating the second oscillator signal by dividing the reference frequency by a second value, wherein the first value and the second value are selected so that a sum of the first oscillator signal and the second oscillator signal at least substantially equals the carrier frequency.

26. A method for demodulating signals, comprising:

generating first and second oscillator signals; and simultaneously mixing a received signal at a carrier frequency with the first and second oscillator signals in a single mixer to generate a baseband signal, wherein the first and second oscillator signals are generated so that all harmonics of the first and second oscillator signals are different from the carrier frequency.

27. The method of claim 26, wherein said generating step includes:

generating the first oscillator signal by dividing a reference frequency by a first value; and generating the second oscillator signal by dividing the reference frequency by a second value, wherein the first value and the second value are selected so that a sum of the first oscillator signal and the second oscillator signal at least substantially equals the carrier frequency.

28. A method for generating oscillator signals for performing signal demodulation, comprising:

generating a first oscillator signal;

generating a second oscillator signal;

wherein the first and second oscillator signals are generated so that all harmonics of the first and second oscillator signals are different from a carrier frequency of a received signal, generating the first oscillator signal by dividing a reference frequency by a first value; and generating the second oscillator signal by dividing the first oscillator signal by a second value, wherein the first value and the second value are selected so that a sum of the first oscillator signal and the second oscillator signal at least substantially equals the carrier frequency.

29. The method of claim 28, wherein the first oscillator signal and the second oscillator signal are concurrently mixed with the received signal of the carrier frequency.

30. A frequency converter, comprising:

means for dividing an input signal frequency by a predetermined value to produce an output signal frequency;

means for mixing the output signal frequency with a carrier signal frequency to produce a converted signal frequency, which is substantially equal to a difference between the output signal frequency and the carrier signal frequency, wherein the predetermined value and the input signal frequency are selected such that the carrier signal frequency is not substantially equivalent to an integer multiple of the output signal frequency; and means for dividing the input signal frequency by predetermined values to produce N output signal frequencies, wherein N is an integer greater than one, wherein a sum of the N output signal frequencies is substantially equal to the carrier frequency, and wherein the N output signal frequencies are simultaneously provided to a single mixer.

31. The frequency converter of claim 30, further comprising:

means for generating the input signal frequency with an oscillator, wherein the input signal frequency generated by the oscillator is substantially equivalent to the carrier signal frequency multiplied by a compound fraction.

32. A frequency converter, comprising:

N frequency dividers that each divides an Nth input signal frequency by an Nth value to produce an Nth output signal frequency; and N frequency mixers that each mix a separate corresponding one of the N output signal frequencies with a separate one of N corresponding carrier signal frequencies to produce an Nth converted signal frequency, which is substantially equal to a difference between the Nth output signal frequency and the Nth carrier signal frequency, wherein N is an integer greater than one, and the Nth value and the corresponding Nth input signal frequency are selected such that the Nth carrier signal frequency is not substantially equivalent to an integer multiple of the Nth output signal frequency, wherein:

an $M^{th}$ output signal frequency serves as an $M^{th+1}$ input signal frequency to a corresponding $M^{th+1}$ frequency divider; and M is an integer value that is equal to N−1.

33. A method of frequency conversion, comprising:

dividing each of N input signal frequencies by a corresponding Nth value to produce a corresponding Nth output signal frequency;

mixing each of the N output signal frequencies with a separate one of N corresponding carrier signal frequencies to produce an Nth converted signal frequency, which is substantially equal to a difference between the Nth output signal frequency and the Nth carrier signal frequency, wherein N is an integer greater than one, and the Nth value and the corresponding Nth input signal frequency are selected such that the Nth carrier signal frequency is not substantially equivalent to an integer multiple of the Nth output signal frequency; and providing an $M^{th}$ output signal frequency to an $M^{th+1}$ frequency divider as an $M^{th+1}$ input signal frequency, wherein the $M^{th+1}$ frequency divider divides the $M^{th+1}$ input signal frequency by the corresponding Nth value to produce the corresponding $M^{th+1}$ output signal frequency, and M is an integer value that is equal to N−1.

* * * * *